June 25, 1929.        A. W. BRUCE        1,718,329
LOCOMOTIVE TRUCK EQUALIZER
Filed Dec. 14, 1927
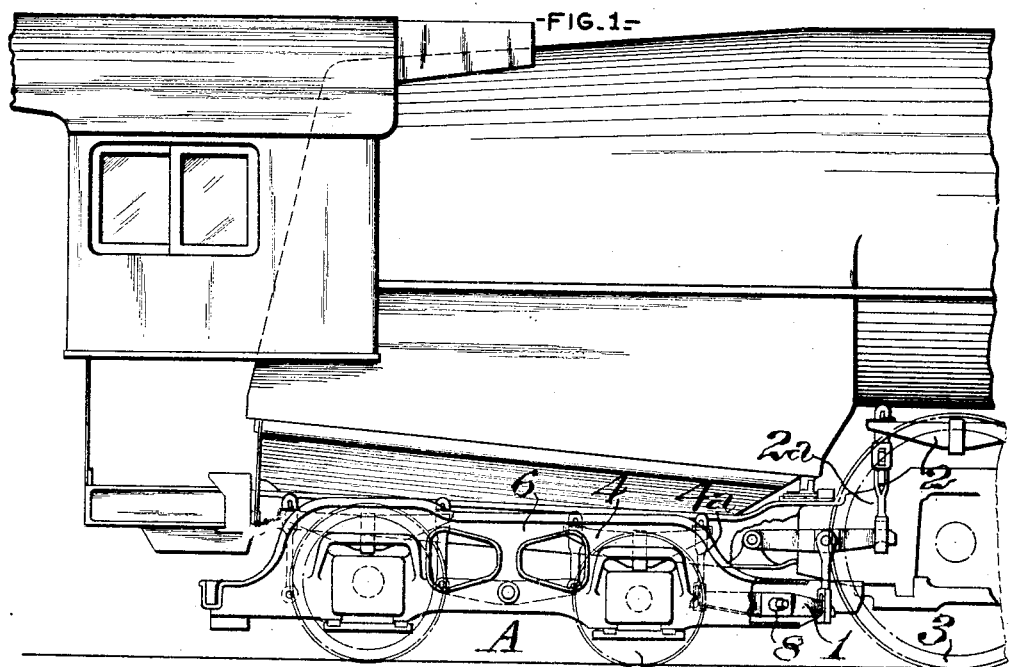
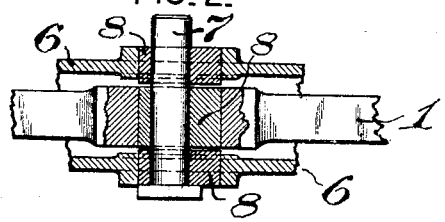
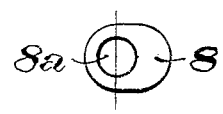
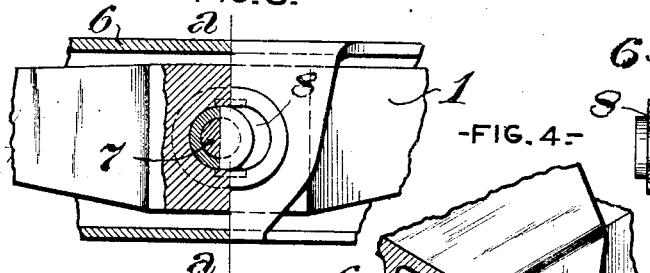
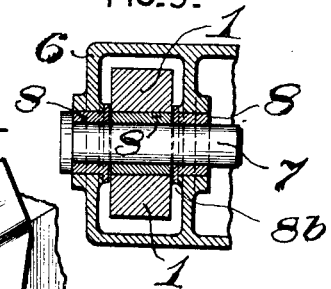
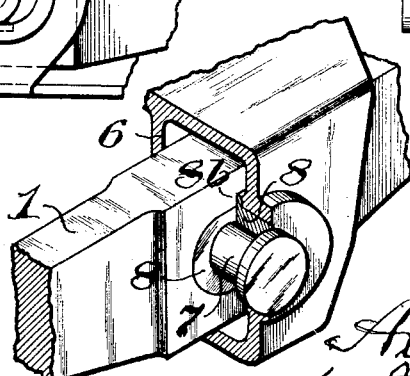
WITNESSES
INVENTOR

Patented June 25, 1929.

1,718,329

UNITED STATES PATENT OFFICE.

ALFRED W. BRUCE, OF NEW YORK, N. Y.

LOCOMOTIVE-TRUCK EQUALIZER.

Application filed December 14, 1927. Serial No. 239,835.

This invention relates, generally, to locomotive trailing trucks, and, particularly, to those of the four wheel type. Its object is to provide an appliance, of simple and inexpensive construction and ready applicability in standard practice, whereby an increase or decrease, as may be desired, of the proportionate relation of the weight borne by the truck to that sustained by the spring suspension system of the driving wheels, may be speedily and conveniently effected.

The improvement claimed is hereinafter fully set forth.

In the accompanying drawing: Figure 1 is a side view, in elevation, of the rear portion of a locomotive engine, illustrating an application of the invention; Fig. 2, a partial horizontal section, on an enlarged scale, through one of the side frames of the trailing truck, showing a plan view of an equalizer; Fig. 3, a view, half in vertical section, through a side frame and an equalizer fulcrum pin, and half in side elevation; Fig. 4, a similarly disposed view, in perspective; Fig. 5, a vertical transverse section, on the line $a\,a$ of Fig. 3; and, Fig. 6, a side view, in elevation, of an adjusting block.

The length of the equalizers of two wheeled locomotive trailing trucks of the various standard designs, is sufficiently great to admit of forming a plurality of longitudinally spaced holes, through any one of which an equalizer fulcrum pin may be passed, in order to change the location of the pin, relatively to the end connections of the equalizer when it is desired to vary the relative proportions of the weight of the locomotive sustained on the spring arrangement thereof and the rear driving wheels.

In the four wheeled trailing trucks which have recently been extensively adopted, the equalizers have, under the necessary conditions of the design, been materially shortened, and, consequently, a much smaller change in the location of the fulcrum pin effects, to a much greater extent, the transfer of weight from the truck to the spring suspension, and vice versa. It has been found that the required variation of the fulcrum pin axis is so comparatively slight, that it is not practicable to provide a plurality of fulcrum pin holes in the short equalizers as were formed in the long equalizers of the two wheeled trucks, for the reason that the holes would overlap each other.

The present invention relates to means for effecting a much finer adjustment of the fulcrum pin by the provision of insertible and removable adjusting blocks, which are fitted eccentrically on the fulcrum pins, and secured in adjusted position by suitable keys.

In the practice of the invention, referring descriptively to the specific embodiment thereof which is herein exemplified as applied in connection with a four wheeled locomotive trailing truck, which is indicated, as an entirety, by A, the forward ends of the equalizers, 1, are, as heretofore, connected, through an intermediate linkage, to the adjacent hangers, $2^a$, of the springs, 2, of the rear pair of driving wheels, 3. The rear ends of the equalizers are connected to the forward hangers, $4^a$, of the springs, 4, of the forward pair of trailing truck wheels, 5.

The equalizers are, as in prior practice, pivotally connected to the side frame members, 6, of the truck, by fulcrum pins, 7, on which they are journalled, and which are fixed in the side frames. In order, in accordance with the invention, to vary the relation of the fulcrum pin axes to the equalizers, and thereby to vary the lever arms of the equalizers, and correspondingly vary the distribution of weight between the truck and the driving wheel spring suspension, adjusting blocks, 8, are fitted, in longitudinal slots, in the equalizers, and in the adjoining members of the truck frame, 6. The upper and lower surfaces of the adjusting blocks are similar, in correspondence with the slots in which they are fitted, their middle portions being flat, and their end surfaces may be either segmental, as shown in Fig. 6, or flat, as preferred. A fulcrum pin bore, $8^a$, is formed in each of the adjusting blocks, the axial line of said bore being out of line with the middle vertical plane of the adjusting block, and at a distance therefrom equal to the change of relative length of the lever arms of the equalizer, which is desired and determined to effect the change of distribution of weight resultant on the reversal of position of the adjusting blocks in the equalizer and the truck frame. In order to prevent lateral displacement of the outer adjusting blocks, end flanges, $8^b$, may be formed thereon, or they may be held in place by plates, on the outside of the fulcrum pin.

In effecting desired adjustments of the fulcrum pins, relatively to the equalizers, the adjusting blocks are reversed, that is, turned, end for end, in the slots of the equalizers and truck frames in which they are fitted, and, by the resultant reversal of position of their fulcrum pin bores, the fulcrum pins are moved to the positions in which the required proportion of the lever arms of the equalizers is properly adjusted to the relative lengths by which the required distribution of weight will be effected. It will be obvious that this adjustment may be readily effected.

What is claimed as the invention, and desired to be secured by Letters Patent is:

1. In a locomotive, the combination, with a truck frame, of an equalizing lever for transmitting weight between said frame and a driving wheel system; a fulcrum pin, coupling said equalizing lever to the truck frame; and adjusting blocks, having bores for the fulcrum pin, disposed longitudinally out of their middle vertical planes, and fitted, reversibly, in the truck frame and equalizing lever.

2. In a locomotive, the combination, with a truck frame, of an equalizing lever for transmitting weight between said frame and a driving wheel system; a fulcrum pin, coupling said equalizing lever to the truck frame; and adjusting blocks, fitted, reversibly, in longitudinal slots in the truck frame, and having bores for the fulcrum pin, disposed longitudinally out of their middle vertical planes.

3. In a locomotive, the combination, with a truck frame, of an equalizing lever for transmitting weight between said frame and a driving wheel system; a fulcrum pin, coupling said equalizing lever to the truck frame; adjusting blocks, fitted, reversibly, in longitudinal slots in the truck frame, and having bores for the fulcrum pins, disposed longitudinally out of their middle vertical planes; and means for preventing lateral displacement of the adjusting blocks.

4. A reversible adjusting block for locomotive truck equalizers, having similar upper and lower faces; a fulcrum bore, disposed longitudinally out of its middle vertical plane; and a flange extending from the inner end thereof for preventing lateral outward displacement.

5. In a locomotive, the combination with a truck frame and a driving wheel system; of a lever for transmitting weight between said frame and driving wheel system; a fulcrum pin coupling said lever to the truck frame; adjusting blocks fitted reversibly in longitudinal slots in the truck frame, and having bores for the fulcrum pin, disposed longitudinally out of their middle vertical planes; and means associated with the lever movable to various positions to shift the fulcrum point of the lever.

6. In a locomotive, the combination with a truck frame and a driving wheel system; of a lever for transmitting weight between said frame and driving wheel system; a fulcrum pin coupling said lever to the truck frame; adjusting blocks fitted reversibly in longitudinal slots in the truck frame, and having bores for the fulcrum pin, disposed longitudinally out of their middle vertical planes; means for preventing lateral displacement of the adjusting blocks; and means associated with the lever movable to various positions to shift the fulcrum point of the lever.

ALFRED W. BRUCE.